(12) United States Patent
Musella

(10) Patent No.: US 12,554,022 B2
(45) Date of Patent: Feb. 17, 2026

(54) SHARED READ-ONLY MEMORY ARCHITECTURE FOR PSEUDO-RANDOM CODE GENERATION IN A SATELLITE-BASED NAVIGATION SYSTEM ARCHITECTURE

(71) Applicant: STMicroelectronics International N.V., Geneva (CH)

(72) Inventor: Gennaro Musella, Milan (IT)

(73) Assignee: STMicroelectronics International N.V., Geneva (CH)

( * ) Notice: Subject to any disclaimer, the term of this patent is extended or adjusted under 35 U.S.C. 154(b) by 302 days.

(21) Appl. No.: 18/334,458

(22) Filed: Jun. 14, 2023

(65) Prior Publication Data
US 2024/0418867 A1    Dec. 19, 2024

(51) Int. Cl.
   *G01S 19/32* (2010.01)
   *G01S 19/30* (2010.01)

(52) U.S. Cl.
   CPC .............. *G01S 19/32* (2013.01); *G01S 19/30* (2013.01)

(58) Field of Classification Search
   CPC ................................ G01S 19/32; G01S 19/30
   See application file for complete search history.

(56) References Cited

U.S. PATENT DOCUMENTS

| | | | | |
|---|---|---|---|---|
| 10,996,341 B2 * | 5/2021 | Musella | ................... | H04J 13/12 |
| 11,391,850 B1 * | 7/2022 | Xie | ........................ | G01S 19/14 |
| 2004/0002364 A1 * | 1/2004 | Trikkonen | ............ | H04L 5/0023 |
| | | | | 455/95 |
| 2008/0219327 A1 * | 9/2008 | Rushanan | ............... | H04J 13/00 |
| | | | | 375/E1.002 |
| 2009/0002227 A1 | 1/2009 | Jia et al. | | |
| 2019/0041530 A1 * | 2/2019 | Veitsel | .................... | G01S 19/38 |
| 2022/0137236 A1 | 5/2022 | Conflitti et al. | | |
| 2024/0329259 A1 * | 10/2024 | Palella | .................... | G01S 19/32 |
| 2024/0356665 A1 * | 10/2024 | Gu | ..................... | H04W 56/0015 |
| 2024/0357541 A1 * | 10/2024 | Li | .......................... | H04W 24/10 |

FOREIGN PATENT DOCUMENTS

| | | | |
|---|---|---|---|
| CN | 104808221 A | * | 7/2015 |
| CN | 110727004 A | | 1/2020 |
| CN | 111694029 A | | 9/2020 |
| EP | 3614179 A1 | | 2/2020 |

OTHER PUBLICATIONS

Extended European Search Report for European Application No. 24178148.3, dated Nov. 21, 2024, 9 pages.

* cited by examiner

*Primary Examiner* — Marcus E Windrich
(74) *Attorney, Agent, or Firm* — Alston & Bird LLP

(57) ABSTRACT

An apparatus, method, and portable navigation device for determining a PRN code to correlate with a ranging code on a satellite-based navigation system receiver are provided. An example satellite-based navigation system receiver may include a plurality of tracking channels, wherein each tracking channel of the plurality of tracking channels is configured to generate a pseudo-random code based at least in part on a first code value from a first position in a code sequence and a second code value from a second position in the code sequence. The example satellite-based navigation system receiver may further comprise a read-only memory configured to store the code sequence. A second plurality of the plurality of tracking channels may be configured to receive the first code value and the second code value from the read-only memory.

14 Claims, 10 Drawing Sheets

SHARED READ-ONLY MEMORY ARCHITECTURE FOR PSEUDO-RANDOM CODE GENERATION IN A SATELLITE-BASED NAVIGATION SYSTEM ARCHITECTURE

TECHNOLOGICAL FIELD

Embodiments of the present disclosure relate generally to the generation of pseudo-random (PRN) codes in a satellite based navigation system, and more particularly, to utilizing a shared read-only memory (ROM) to generate PRN codes in a satellite-based navigation system receiver architecture.

BACKGROUND

A satellite-based navigation system receiver determines its position by processing signals broadcast by various in-range satellites and determining a distance to each of the satellites by means of extracting the propagation time of the incoming signals traveling through space at the speed of light.

In the last decade several navigation systems have been developed by different countries, such as Global Positioning System (GPS), Global'naya Navigatsionnaya Sputnikovaya Sistema (GLONASS), Galileo System, BeiDou Navigation Satellite System (BDS), and others, as part of the Global Navigation Satellite System (GNSS). Most GNSS satellites use Code-Division Multiple Access (CDMA) techniques to multiplex several satellite signals onto the same frequency. To accomplish this, each satellite is assigned a PRN code that modulates the transmitted signal. GNSS receivers have prior knowledge of each satellite's PRN code and correlate the incoming signals with local code replicas, generated on the satellite-based navigation system (GNSS) receiver, to determine if a given satellite is visible or not and determine an accurate distance to the satellite.

Applicant has identified many technical challenges and difficulties associated with generating PRN codes on a satellite-based navigation system receiver. Through applied effort, ingenuity, and innovation, Applicant has solved problems related to generating PRN codes on a satellite-based navigation system receiver by developing solutions embodied in the present disclosure, which are described in detail below.

BRIEF SUMMARY

Various embodiments are directed to an example apparatus, method, and portable navigation device for determining a PRN code to correlate with a ranging code on a satellite-based navigation system receiver. In accordance with some embodiments of the present disclosure, an example satellite-based navigation system receiver is provided. In some embodiments, the example satellite-based navigation system receiver may comprise a plurality of tracking channels, wherein each tracking channel of the plurality of tracking channels is configured to generate a pseudo-random code based at least in part on a first code value from a first position in a code sequence and a second code value from a second position in the code sequence. The example satellite-based navigation system receiver may further comprise a read-only memory configured to store the code sequence, wherein a second plurality of the plurality of tracking channels are configured to receive the first code value and the second code value from the read-only memory.

In some embodiments, each tracking channel of the plurality of tracking channels may be configured to generate a pseudo-random code in accordance with a plurality of satellite-based navigation systems.

In some embodiments, each pseudo-random code of the plurality of satellite-based navigation systems may be generated based at least in part on an associated code sequence.

In some embodiments, each associated code sequence associated with the plurality of satellite-based navigation systems may be stored in the read-only memory.

In some embodiments, each tracking channel of the plurality of tracking channels may be configured to generate a pseudo-random code in accordance with a global positioning system (GPS) satellite-based navigation system and a BeiDou satellite-based navigation system.

In some embodiments, the pseudo-random code may be transmitted as a portion of a ranging code.

In some embodiments, the pseudo-random code transmitted in accordance with the GPS satellite-based navigation system may be transmitted as a portion of an L1C signal and the pseudo-random code transmitted in accordance with the BDS satellite-based navigation system may be transmitted as a portion of a B1C signal.

In some embodiments, the code sequence may be a Legendre sequence.

In some embodiments, the satellite-based navigation system receiver may further comprise a plurality of read-only memories, wherein each read-only memory of the plurality of read-only memories is configured to store the code sequence. In addition, the satellite-based navigation system receiver may further comprise a clock having a clock frequency, wherein the clock is configured to synchronize one or more operations on the satellite-based navigation system receiver.

In some embodiments, the number of read-only memories in the plurality of read-only memories may be determined based at least in part on the clock frequency of the clock.

In some embodiments, the clock frequency may be determined based at least in part on a number of read-only memories in the plurality of read-only memories.

An example method for determining a pseudo-random noise (PRN) code on a satellite-based navigation system, is further provided. In some embodiments, the method may comprise requesting, from a read-only memory configured to store a code sequence, a first code value at a first memory location, wherein the first memory location corresponds with a first index in the code sequence; and requesting, from the read-only memory, a second code value at a second memory location, wherein the second memory location corresponds with a second index in the code sequence. The method may further comprise generating a first pseudo-random code based at least in part on the first code value and the second code value; wherein a plurality of tracking channels is configured to generate a pseudo-random code based at least in part on a plurality of code values stored in the read-only memory.

In some embodiments, each tracking channel of the plurality of tracking channels may be configured to generate a pseudo-random code in accordance with a plurality of satellite-based navigation systems.

In some embodiments, each pseudo-random code of the plurality of satellite-based navigation systems may be generated based at least in part on an associated code sequence.

In some embodiments, each associated code sequence associated with the plurality of satellite-based navigation systems may be stored in the read-only memory.

In some embodiments, each tracking channel of the plurality of tracking channels may be configured to generate a pseudo-random code in accordance with a global positioning system (GPS) satellite-based navigation system and a BeiDou satellite-based navigation system.

In some embodiments, the pseudo-random code may be transmitted as a portion of a ranging code.

In some embodiments, the pseudo-random code transmitted in accordance with the GPS satellite-based navigation system may be transmitted as a portion of an L1C signal and the pseudo-random code transmitted in accordance with the BDS satellite-based navigation system may be transmitted as a portion of a B1C signal.

In some embodiments, the code sequence may be a Legendre sequence.

An example portable navigation device for determining a location using a satellite-based navigation system receiver, is further provided. In some embodiments, the example portable navigation device may comprise an antenna configured to receive an acquisition signal from a remote satellite; and a satellite-based navigation system receiver electrically connected to the antenna. The satellite-based navigation system receiver may comprise a plurality of tracking channels, wherein each tracking channel of the plurality of tracking channels is configured to generate a pseudo-random code based at least in part on a first code value from a first position in a code sequence and a second code value from a second position in the code sequence. In addition, the example satellite-based navigation system receiver may comprise a read-only memory configured to store the code sequence, wherein a second plurality of the plurality of tracking channels are configured to receive the first code value and the second code value from the read-only memory. In some embodiments, the portable navigation device may be configured to determine a location based at least in part on a comparison of the pseudo-random code with the acquisition signal.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
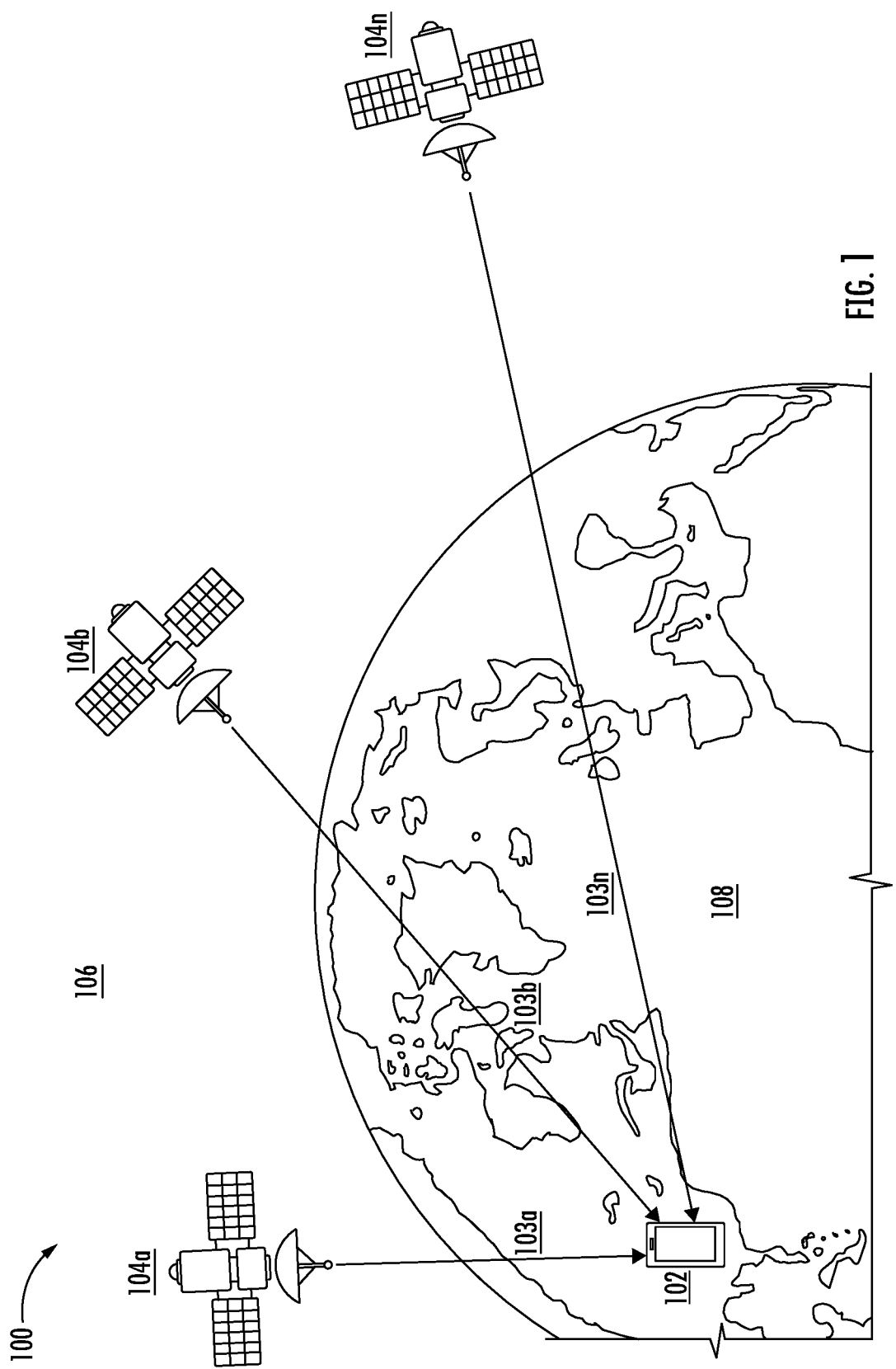
FIG. 1 illustrates a satellite-based navigation system including an example satellite-based navigation system receiver in accordance with one or more embodiments of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with generating PRN codes on a satellite-based navigation system receiver, particularly on a satellite-based navigation system receiver supporting multiple tracking channels and/or multiple satellite-based navigation systems. As understood by those of skill in the field to which the present disclosure pertains, there are numerous example scenarios in which a user may need to generate PRN codes for multiple tracking channels and/or multiple satellite-based navigation systems.

For example, many satellite-based navigation system receivers utilize multiple tracking channels to acquire one or more transmitted signals, correlate with the transmitted signals, determine the distance to each satellite transmitting the transmitted signal, and track the acquired signal. Having a plurality of tracking channels can further speed up the acquisition process and reacquisition process by dividing the search sequence among several different tracking channels.

Further, many satellite-based navigation system receivers are configured to support multiple GNSS satellite-based navigation systems. In the last decade several navigation systems have been developed by different countries, such as Global Positioning System (GPS), Global'naya Navigatsionnaya Sputnikovaya Sistema (GLONASS), Galileo System, BeiDou Navigation Satellite System (BDS), and others. Most GNSS satellites use Code-Division Multiple Access (CDMA) techniques to multiplex several satellite signals onto the same frequency. To accomplish this, each satellite is assigned a pseudo-random noise (PRN) code that modulates the transmitted signal. The satellite-based navigation system receivers have prior knowledge of all possible satellite PRN codes and correlate the incoming signals with local code replicas, generated on the satellite-based navigation system receiver, to determine if a given satellite is visible or not and determine an accurate distance to the satellite. In addition, once a signal from a satellite is acquired, a tracking channel on the receiver is utilized to continuously and accurately track the signal from a satellite.

One aspect of continuously tracking a satellite on a tracking channel is to generate a PRN code for each satellite and correlate a received signal with the PRN code.

As described herein, PRN code generation is an integral part of acquisition and tracking of a transmitted signal from a satellite-based navigation system satellite. A satellite within a satellite-based navigation system may generate a number of signals, also known as ranging codes, in support of location determination. Such codes include an L1C code (or civilian code) from a GPS satellite and a B1C code from a BDS satellite. Ranging codes provide a sequence of bits (or a PRN sequence) unique to a particular satellite that allow a receiver to identify the particular satellite and determine a distance from the satellite. Utilizing the distance determination from a plurality of satellites may enable a receiver to triangulate its position.

A common aspect of PRN code generation is the generation of a Legendre sequence of values. For example, both GPS and BDS compatible receivers require the generation of two Legendre sequence values during the generation of each bit (or chip) of a PRN code. A Legendre sequence may be defined such that the value in the sequence at index i is 1 if there exists an integer x such that i is congruent to $x^2$ modulo an odd prime number (e.g., 10223), and 0 otherwise. For example, in a GPS satellite-based navigation system, a Legendre sequence (L(t)) may be determined using the following pseudocode:

L(0)=0;
L(t)=1, if there exists an integer x such that t is congruent to $x^2$ modulo 10223;
L(t)=0, if there exists no integer x such that t is congruent to $x^2$ modulo 10223;

Similarly, the Legendre sequence in a BDS satellite-based navigation system may be determined using the following pseudocode:

```
LEGENDRE_SEQ([1:10243]) = 0;
for t = 1 : (10243-1 / 2)
    LEGENDRE_SEQ(1+mod((t*t),10243)) = 1;
end
```

A Weil code, may be based on one or more Legendre sequences. For example, in GPS, a Weil code may be generated by inserting a fixed expansion sequence at a unique position within an intermediate code generated based on the exclusive-or of the Legendre sequence and a shifted copy of the Legendre sequence, wherein the shift is unique to a particular satellite. Similarly, the Weil code in a BDS satellite-based navigation system may be based on operations performed on two values from locations in the generated Legendre sequence.

As described herein, the determination of a Weil code, and particularly a determination of the values within a Legendre sequence comprising the Weil code may be time and compute intensive. In addition, as the need for more accurate, higher performing receivers increases, the number of tracking channels also continues to increase. For example, some GNSS receivers have implemented more than 96 tracking channels. Further, as the number of tracking channels increases, along with the number of satellite-based navigation systems, and the number of satellites supported by each satellite-based navigation system, the need to quickly generate Legendre sequences in support of unique PRN codes also increases.

To deal with the computational complexity related to the generation of PRN codes, some examples have pre-generated one or more Legendre sequences and stored them in a read-only memory (ROM) associated with each tracking channel. For satellite-based navigation systems requiring multiple Legendre sequences in the generation of PRN codes, more than one ROM, each storing a Legendre sequence, have been created and populated for each tracking channel. On a high performing receiver, for example, one supporting 96 or more tracking channels, such an example may require as many as 192 read-only memories. The silicon area and power consumption of the GNSS receiver required to support the associated ROMs may be inhibitive.

The various example embodiments described herein utilize various techniques for sharing the read-only memory (ROM) between various tracking channels of a satellite-based navigation system receiver when generating PRN codes. For example, in some embodiments, a single ROM may include one or more Legendre sequences to support the generation of a PRN code by enabling the simultaneous access to both a first code value at a first position in the Legendre sequence and a second code value at a second position in the code sequence, wherein the second position is at a fixed positional shift from the first position. In addition, in some embodiments, a single ROM may store generated Legendre sequences for more than one satellite-based navigation system. For example, a single ROM may store the Legendre sequence necessary to produce a PRN code for a GPS satellite-based navigation system, and the single ROM may further store the Legendre sequence necessary to produce a PRN code for a BDS satellite-based navigation system.

Further, given a shared ROM architecture, in some embodiments, the architecture of the satellite-based navigation receiver may be parameterized and the architecture determined at build time. For example, the satellite-based navigation system receiver may determine the best architecture to balance latency, accuracy, and power consumption during the build of the system architecture. To illustrate parameterization, for proper operation, each tracking channel of a satellite-based navigation system receiver requires access to the ROM every $1/F_0$ clock cycles, where $F_0$ is the frequency of the satellite-based navigation system signal transmission. The parameterized architecture may be determined in one of at least two ways (1) by fixing the clock frequency and determining the number of ROMs required to meet the timing requirements of the clock frequency; or (2) by fixing the number of ROMs and determining the necessary clock frequency to utilize the number of available ROMs. Parameterizing the build of a satellite-based navigation system receiver enables a determination of balance between a variety of factors (e.g., power consumption, silicon area, latency, etc.) when building the satellite-based navigation system receiver.

As a result of the herein described example embodiments and in some examples, the silicon area required to support multiple satellite-based navigation systems and multiple tracking channels may be greatly reduced. In addition, the power consumption required to generate PRN codes for multiple tracking channels supporting multiple navigation systems may likewise be reduced.

Referring now to FIG. 1, an example satellite-based navigation system 100 is provided. As depicted in FIG. 1, the satellite-based navigation system 100 includes a plurality of satellites 104a-104n in a space environment 106. Each satellite 104a-104n is configured to communicate with a receiver 102 on the Earth 108 through a communication link 103a-103n.

As depicted in FIG. 1, a receiver 102 may communicate with one or more satellite-based navigation systems 100. A satellite-based navigation system 100 may be any constellation of satellites providing signals from a space environment 106 enabling a receiver 102 on the Earth 108 to determine a location of the receiver 102. A satellite-based navigation system 100 may comprise one or more Global Navigation Satellite Systems (GNSSs). For example, a satellite-based navigation system 100 may comprise a Global Positioning System (GPS), Global'naya Navigatsionnaya Sputnikovaya Sistema (GLONASS), Galileo System, BeiDou Navigation Satellite System (BDS), or other navigation system. For example, a satellite-based navigation system 100 may comprise a GPS having up to 32 medium Earth orbit satellites (e.g., satellite 104a-104n) in various orbital planes. As another example, a satellite-based navigation system 100 may comprise a BDS, having 24 satellites in medium earth orbit and additional satellites in geostationary orbit. In some embodiments, the satellite-based navigation system 100 may comprise satellites 104a-104n from multiple GNSSs, for example, a receiver 102 may be configured to communicate with satellites 104a-104n in the GPS and satellites in the BDS.

As further depicted in FIG. 1, the example satellite-based navigation system 100 includes a plurality of satellites 104a-104n positioned in a space environment 106. A satellite 104a-104n may be any apparatus, device, or system of devices, positioned in the space environment 106 and configured to transmit one or more signals toward the Earth 108, enabling a receiver 102 to determine a physical location. Each satellite 104a-104n in the satellite-based navigation system 100 may be positioned to provide communication with at least a portion of the Earth 108. For example, a GPS system may consist of up to 32 satellites 104a-104n in medium earth orbit. Each satellite in the GPS system circles the Earth 108 twice per day, in one of 6 equally-spaced orbital planes around the Earth 108 to provide continuous, worldwide coverage. Such an arrangement ensures that a receiver 102 can receive a signal from at least 4 satellites 104a-104n from virtually any point on the Earth 108 at any point in time. In the BDS system, in addition to the satellites 104a-104n orbiting the Earth 108 in Medium Earth Orbit, additional satellites 104a-104n may obit the Earth 108 in Geostationary Earth Orbit and Inclined Geo-Synchronous Orbit, to provide additional accuracy in location determination.

Each satellite 104a-104n may transmit one or more signals at a specified frequency or band of frequencies through a communication channel (e.g., communication link 103a-103n). For example, GPS satellites 104a-104n may transmit various signals on the L1 band (1575.42 MHz with a bandwidth of 15.345 MHz), the L2 band (1227.6 MHz with a bandwidth of 11 MHz), and the L5 band (1176.45 MHz with a bandwidth of 12.5 MHz). Similarly, BDS satellites 104a-104n may transmit various signals on the B1 band (1575.42 MHz with a bandwidth of 32.736 MHz), the B2 band (1176.45 MHz with a bandwidth of 20.46 MHz), and the B3 band (1268.52 MHz with a bandwidth of 20.46 MHz). Receivers 102 on the Earth 108 may be configured to receive and decode signals on each of the transmitted bands to determine transmitted ranging codes and data.

The signals transmitted on each communication link 103a-103n by each satellite 104a-104n may enable a receiver 102 on the Earth 108 to determine a distance from the transmitting satellite 104a-104n. For example, a satellite 104a-104n may transmit one or more signals indicating the location and status of the satellite 104a-104n, as well as the precise time from an on-board atomic clock. In some embodiments, several satellites 104a-104n may transmit ranging codes and data over a single channel or frequency band. In such an embodiment, the satellite-based navigation system 100 may use code-division multiple access (CDMA) to coordinate transmission on the frequency band. Each satellite 104a-104n in the satellite-based navigation system 100 may be assigned a pseudo-random noise code (PRN code) which uniquely identifies the ranging codes that a specific satellite 104a-104n uses. A receiver 102 may identify a satellite 104a-104n based on the transmitted PRN code.

As further depicted in FIG. 1, the satellite-based navigation system 100 may communicate with a receiver 102 (e.g., satellite-based navigation system receiver). A receiver 102, may be any system, apparatus, or device, configured to receive transmissions from one or more satellites 104a-104n of one or more satellite-based navigation systems 100 and determine a location based on the received transmissions. A receiver 102 may be configured to receive navigational data necessary to determine the precise location of the transmitting satellite 104a-104n, in addition, the receiver 102 may be configured to receive ranging codes to uniquely identify a transmitting satellite 104a-104n and determine the distance (based on time offset) to the transmitting satellite 104a-104n.

Figure 2:
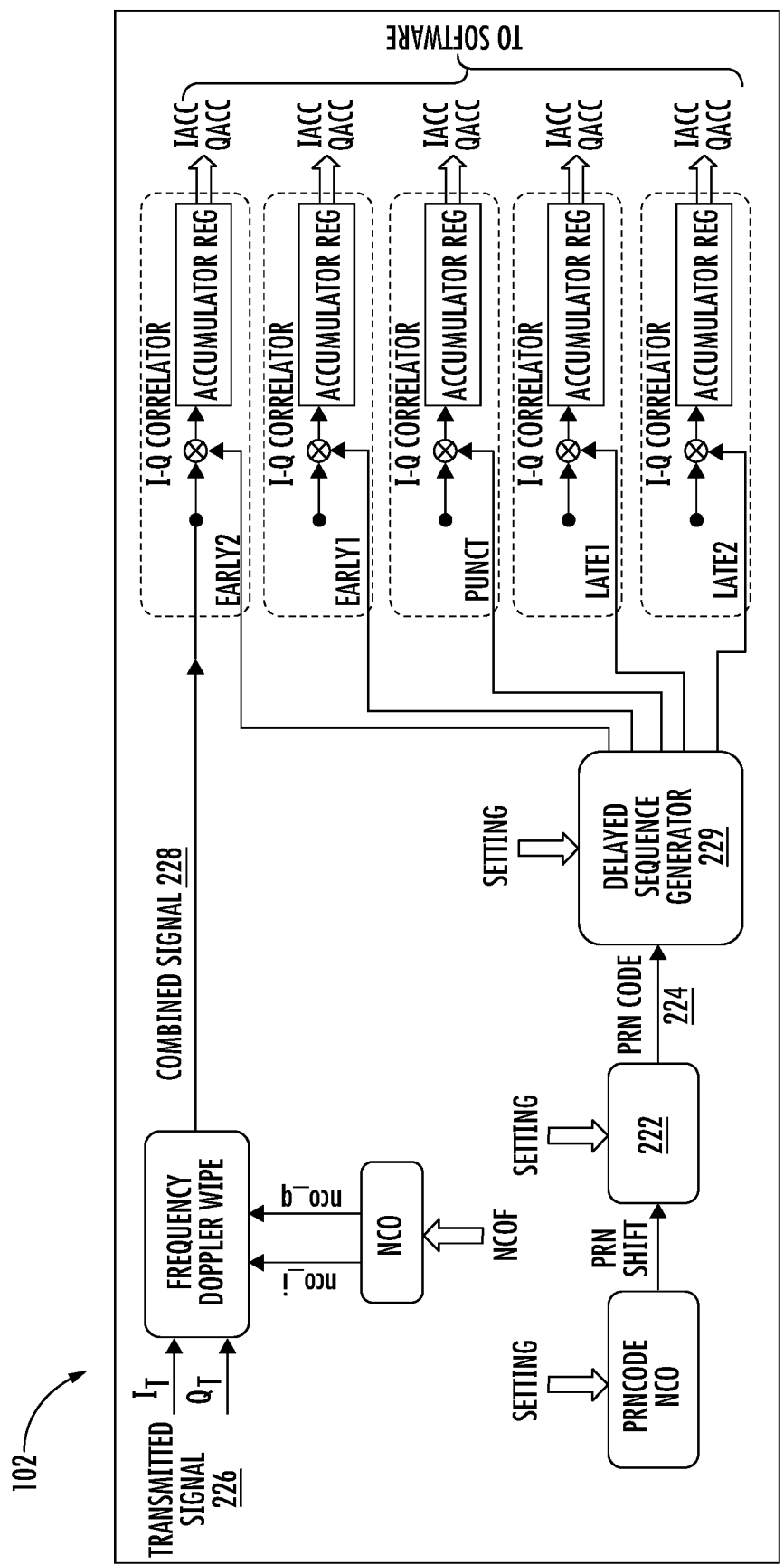
FIG. 2 illustrates an example satellite-based navigation system receiver including a PRN code generator module in accordance with one or more embodiments of the present disclosure.

Referring now to FIG. 2, an example satellite-based navigation system receiver 102 is provided. As depicted in FIG. 2, the example satellite-based navigation system receiver 102 includes a frequency doppler wipe module configured to receive the in-phase and quadrature components of a transmitted signal 226 on a communication link (e.g., communication link 103a-103n). The frequency doppler wipe module further receives an in-phase and quadrature component of a signal from a numerically-controlled oscillator and is configured to output a combined signal 228 based on the received in-phase and quadrature components of the transmitted signal 226. The combined signal 228 is received by a plurality of I-Q correlators.

As further depicted in FIG. 2, the satellite-based navigation system receiver 102 further includes a PRN code generator module 222, configured to receive an output of a PRN code numerically-controlled oscillator and generate a PRN code 224. The PRN code 224 is altered by a GNSS PRN delayed sequence generator to produce delayed, advanced, and/or unaltered copies of the PRN code 224. A delayed, advanced, or unaltered copy of the PRN code 224 is transmitted by a delayed sequence generator 229 to each of the I-Q correlators and compared with the combined signal 228 to determine a correlation. The delayed, advanced, and/or unaltered copy of the PRN-code with the highest correlation serves as an indicator of the offset of the received transmitted signal 226.

As depicted in FIG. 2, the example satellite-based navigation system receiver 102 receives a transmitted signal 226. A transmitted signal 226 may be any signal transmitted by a satellite-based navigation system satellite (e.g., satellite 104a-104n). For example, a GPS satellite typically transmits multiple signals each on the L1 band, L2 band, and L5 band. These signals include a coarse/acquisition code (C/A code), a precision code (P-code), a navigation message, L2C code, L1C code, and other similar signals. Similarly, a BDS satellite typically transmits multiple signals each on the B1 band, B2 band, and B3 band. These signals may include the B1C signal, B1I signal, B2a signal, and B3I signal. In some embodiments, the transmitted signal 226 may include a PRN code or ranging code transmitted simultaneously to uniquely identify the satellite (e.g., satellite 104a-104n) transmitting the transmitted signal 226.

As depicted in FIG. 2, the example satellite-based navigation system receiver 102 includes a PRN code generator module 222, configured to output a PRN code 224. A PRN code generator module 222 may be any apparatus, module, or device configured to output a PRN code 224. Although, depicted as generating a single PRN code 224 in FIG. 2, as described herein, a PRN code generator module 222 may be configured to generate one or more PRN codes 224 for a plurality of tracking channels. In addition, a PRN code generator module 222 may be configured to generate PRN codes 224 for one or more satellite-based navigation systems (e.g., GPS, BDS, GLONASS, Galileo, etc.).

As further depicted in FIG. 2, the PRN code 224 may be utilized to determine a correlation with the ranging code of the transmitted signal 226. A PRN code 224 may be any sequence of numbers used to uniquely identify a transmitting satellite. In some embodiments, a PRN code 224 may be generated such that the resulting signal looks like noise. As such, interference with other transmitted signals may be minimized. In addition, a PRN code 224 may be generated such that the PRN code 224 exhibits good auto-correlation with other signals also containing the PRN code 224. In this way, correlation with a transmitted signal 226 may be quickly and accurately determined.

In some embodiments, a PRN code 224 may comprise one or more mathematical sequences of bits, such as a Legendre sequence. For example, in some embodiments, a GPS satellite may support transmission of an L1C signal. An L1C signal may be transmitted by a GPS satellite to enable interoperability between GPS and other international satellite-based navigation systems. For example interoperability between GPS systems and BDS systems. As with other transmitted signals 226, the L1C signal may comprise a ranging code. As defined, the L1C ranging code is comprised of a Weil code. The Weil code of the L1C signal is a 10223 length sequence constructed via shifting and adding a Legendre sequence (e.g., code sequence) and one of its shifts. In addition, a fixed 7-bit (chip) expansion sequence is inserted in the Weil code at a unique location based on the satellite to create a 10230 chip code. As described herein, the generation of the Weil code includes the use of two Legendre sequence values, a first index and a fixed shift from the first index. The Legendre sequence is based on which integers are square modulo of the prime length of the sequence. The determination of a Legendre sequence may be compute and time intensive. In addition, storing the Legendre sequences for each tracking channel may require significant storage space. As such, there exists a need to quickly and efficiently generate PRN codes for tracking channels on a satellite-based navigation system receiver 102.

Similarly, a B1C signal may be transmitted by a BDS satellite to enhance location determination. As with other transmitted signals 226, the B1C signal comprises a ranging code. As defined, the B1C ranging code utilizes a separately defined Legendre sequence of length 10243, and a shift of the Legendre sequence, to determine a B1C Weil code. Due to the complexity in determining a Legendre sequence, as described herein, there exists a need to quickly and efficiently generate PRN codes based on Legendre sequences, particularly on a satellite-based navigation system receiver 102 supporting multiple tracking channels and multiple satellite-based navigation systems 100.

Figure 3:
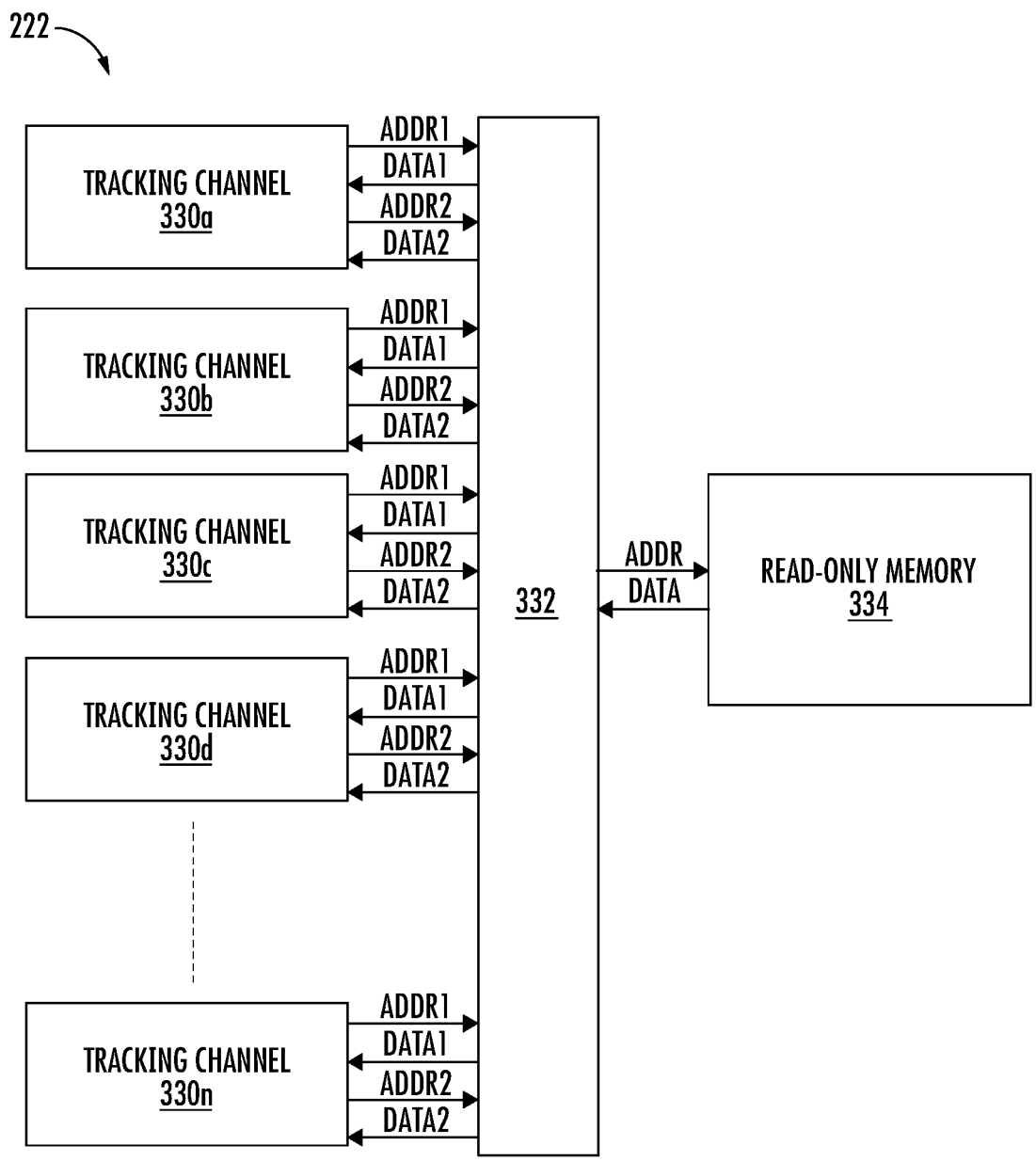
FIG. 3 illustrates an example PRN code generator module comprising a shared read-only memory in accordance with one or more embodiments of the present disclosure.

Referring now to FIG. 3, an example PRN code generator module 322 is provided. As depicted in FIG. 3, the example PRN code generator module 322 includes memory interface circuitry 332 electrically connected to a read-only memory 334 (ROM) and configured to manage the requests of an electrically connected plurality of tracking channels 330a-330n. As further depicted in FIG. 3, each tracking channel 330a-330n is configured to generate two addresses and receive a corresponding data value for each address.

As depicted in FIG. 3, the PRN code generator module 322 includes a read-only memory 334. A read-only memory 334 may be any data storage device in communication with one or more tracking channels (e.g., tracking channel 330a-330n) and configured to return data components necessary to the generation of one or more PRN codes. In some embodiments, the read-only memory 334 is non-transitory and may include, for example, one or more volatile and/or non-volatile memories. In other words, for example, the read-only memory 334 in some embodiments includes or embodies an electronic storage device (e.g., a computer readable storage medium). In some embodiments, the read-only memory 334 is configured to store information, data, content, applications, instructions, or the like. In some embodiments, the read-only memory 334 may comprise a look-up table (LUT). A LUT may be any data structure or memory device implemented in software, firmware, hardware, and/or any combination thereof, that enables direct addressing of a memory location or saved data value via a provided index. For example, in some embodiments, a Legendre sequence may be calculated during start-up or initialization and stored in the read-only memory 334 wherein the memory address in the LUT corresponds with the index within the Legendre sequence. For example, the value of the Legendre sequence associated with index 1 may be stored at a memory location 1, the value of the Legendre sequence associated with index 2 may be stored at a memory location 2, and so on, all the way to, for example, the value of the Legendre sequence associated with index 10223 (or 10243). By determining the Legendre sequence during start-up or configuration and storing the associated values in a look-up table before operation, both the Legendre sequence value (e.g., first code value) at a particular index (e.g., first position) and the shift of the Legendre sequence value (e.g., second code value) at a second index (e.g., second position) may be accessed via direct addressing, speeding up the determination of the PRN code value.

As further depicted in FIG. 3, the example PRN code generator module includes a plurality of tracking channels 330a-330n. A tracking channel 330a-330n may be any hardware, software, firmware, and/or combination thereof, configured to acquire a transmitted signal, demodulate any data contained on a transmitted signal, and track the transmitting satellite and associated transmitted signal. A satellite-based navigation system receiver may include 1 tracking channel 330a-330n, 6 tracking channels 330a-330n, 12, tracking channels 330a-330n, 96 tracking channels 330a-330n, or more. More tracking channels enable a satellite-based navigation system receiver to acquire a signal from one or more transmitting satellites faster. For example, the acquisition process, including cycling through the various possible PRN codes and offsets may be parallelized based on the number of tracking channels 330a-330n available. In addition, during operation, a portion of the tracking channels 330a-330n may be dedicated to tracking an already acquired signal while another portion of tracking channels 330a-330n are dedicated to acquiring new transmitted signals from new satellites or from additional satellite-based navigation systems.

In some embodiments, a tracking channel 330a-330n may be configured to acquire and track transmitted signals from one or more satellite-based navigation systems, for example, GPS and BDS. As such, the tracking channel 330a-330n may generate a PRN code (e.g., PRN code 224) for each possible satellite in each satellite-based navigation system, and attempt to correlate the PRN code with the transmitted signal, as described in relation to FIG. 2. As described herein, both the L1C and B1C signals contain a Weil code comprising two values from a Legendre sequence for each bit of the PRN code. Thus, in order to attempt to correlate with a transmitted signal, the PRN code generator module 322 may generate or access a pair of Legendre sequence values for each bit of the PRN code. Due to the number of tracking channels and possible transmitting satellites, the compute time to generate PRN codes may be prohibitive. In addition, creating a LUT for each tracking channel 330a-330n may require excessive silicon area. Thus, sharing a read-only memory 334 between multiple tracking channels 330a-330n, as shown in FIG. 3, may reduce the silicon area required to support a plurality of tracking channels 330a-330n and reduce the time to access sequence values in support of PRN code generation.

As further depicted in FIG. 3, the example PRN code generator module 322 may include memory interface circuitry 332. The memory interface circuitry 332 may be any hardware, firmware, software, or combination thereof configured to arbitrate the request and service of requests by one or more tracking channels 330a-330n and an associated read-only memory 334 or plurality of read-only memories 334. In some embodiments, the memory interface circuitry 332 may receive one or more address requests from the plurality of tracking channels 330a-330n. In such an embodiment, the memory interface circuitry 332 may be configured to service the requests as the read-only memory 334 becomes available. In some embodiments, the memory interface circuitry 332 may provide the data for a new address every clock cycle.

Figure 4:
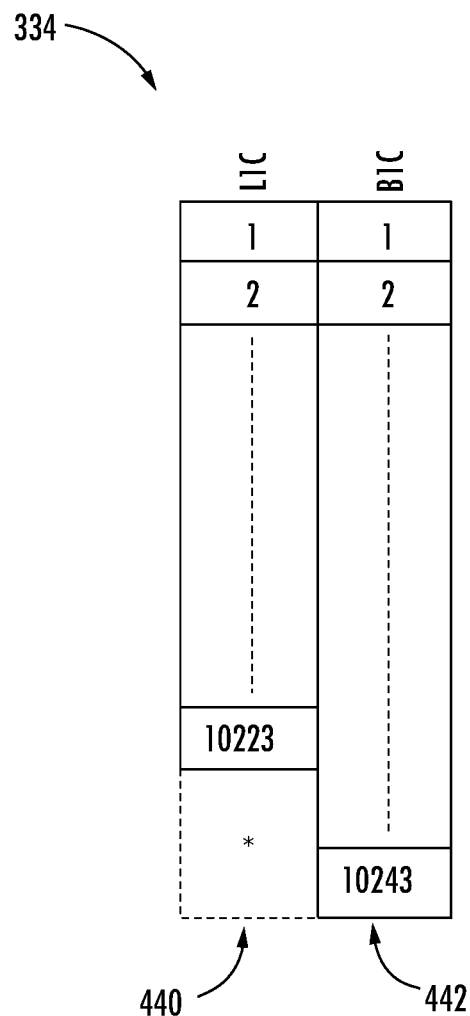
FIG. 4 illustrates an example read-only memory comprising two code sequences in accordance with one or more embodiments of the present disclosure.

Referring now to FIG. 4, the architecture of an example read-only memory 334 is provided. As depicted in FIG. 4, the length of the example read-only memory 334 (e.g., the number of direct addressable memory locations) is sufficient to store a complete code sequence, for example, a complete Legendre sequence (e.g., L1C Legendre sequence 440, B1C Legendre sequence 442) for each supported satellite-based navigation system. As further depicted in FIG. 4, the data width at each memory location in the example read-only memory 334 is sufficiently wide to store a bit (chip) for each of the supported satellite-based navigation system types. Thus, as depicted in FIG. 4, the example read-only memory 334 includes a direct address accessible L1C Legendre sequence 440 and a B1C Legendre sequence 442.

As depicted in FIG. 4, the one or more tracking channels utilizing the read-only memory 334 may be configured to support acquisition and tracking of an L1C signal, such as an L1C signal transmitted by a GPS satellite, and a B1C signal, such as a B1C signal transmitted by a BDS satellite. As defined, an L1C PRN code requires a Legendre sequence of 10223 chips and a B1C PRN code requires a Legendre sequence of 10243 chips. Thus, the read-only memory 334 may be configured to support a minimum of 10243 access addresses, so as to support the storage of a full Legendre sequence for a B1C PRN code. As further depicted in FIG. 4, the data width of the read-only memory 334 is wide enough to support at least one chip for every supported satellite-based navigation system. Thus, the depicted read-only memory 334, at a minimum, is at least 2-bits wide, one bit for the Legendre sequence required for the L1C PRN code and one bit for the Legendre sequence of the B1C PRN code. As such, in an instance in which a GPS satellite-based navigation system and a BDS satellite-based navigation system are supported, the tracking channels may require a read-only memory 334 having a minimum size of 10243 by 2 chips.

In another example, in an instance in which a satellite-based navigation system receiver is configured to support only a GPS satellite-based navigation system, the size of the Legendre code sequence required to generate an L1C PRN code is only 10223, thus, the read-only memory 334 may be configured with a minimum length of 10223 chips. In an instance in which only a GPS satellite-based navigation system is supported, the tracking channels may only require a read-only memory 334 of 10223 by 1 chip.

Figure 5:
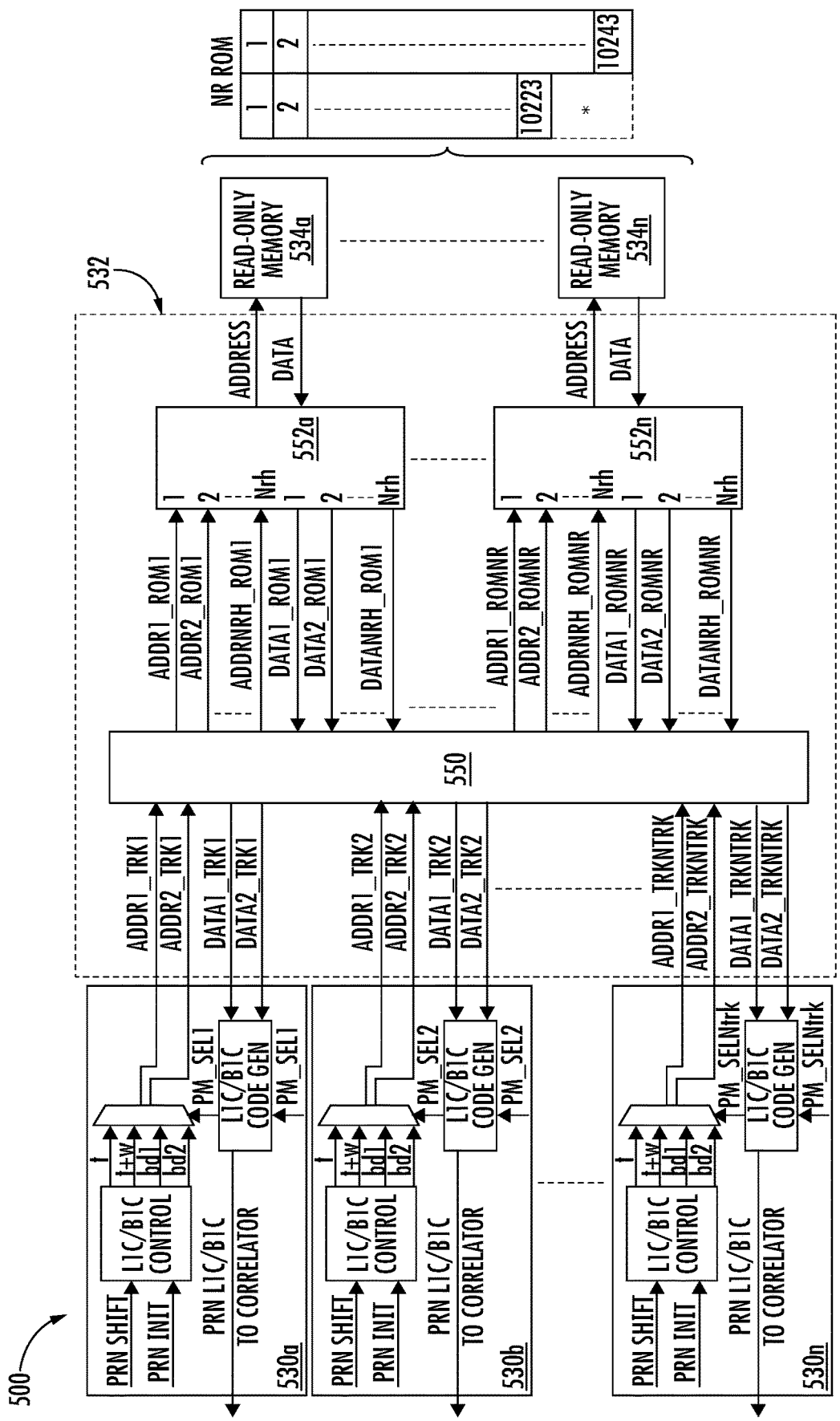
FIG. 5 illustrates an example PRN code generator module comprising a plurality of shared read-only memories in accordance with one or more embodiments of the present disclosure.

Referring now to FIG. 5, an example PRN code generator module 500, utilizing a plurality of read-only memories 534a-534n, is provided. As depicted in FIG. 5, a plurality of tracking channels 530a-530n are configured to support generation of either an L1C PRN code or a B1C prn code depending on the currently selected satellite-based navigation system type. Each tracking channel is electrically connected to memory interface circuitry 532 and configured to request a plurality of addresses and receive a plurality of data values based on the requested data addresses. The memory interface circuitry 532 is further electrically connected to a plurality of read-only memories 534a-534n having an architecture similar to that described in relation to FIG. 4. As further depicted in FIG. 5, the memory interface circuitry 532 comprises a rearrange module 550 configured to receive requests from each of the tracking channels 530a-530n, and a plurality of rom managers 552a-552n each configured to interface with one of the read-only memories 534a-n.

As depicted in FIG. 5, the example PRN code generator module 500 includes a plurality of tracking channels 530a-530n. The example tracking channels 530a-530n of FIG. 5 each support generation of a L1C PRN code and a B1C PRN code for transmission to a delayed sequence generator (e.g., delayed sequence generator 229 of FIG. 2) and to a plurality of correlators for correlation with a transmitted signal (e.g., transmitted signal 226) received from a satellite of a satellite-based navigation system. As depicted in FIG. 5, a request address may be transmitted to the rearrange module 550 based on the satellite-based navigation system type (e.g., GPS, BDS) and the current index of the generated PRN code chip. In some embodiments, two addresses may be provided to the rearrange module 550, corresponding to the two Legendre sequences necessary to compute the PRN code. For example, an address associated with a first index (e.g., first position) and an address associated with the offset of the first index (e.g., second position) may be requested, for example, to determine a L1C PRN code. Similarly, a first address associated with a first index (bd1) in the BDS Legendre sequence and a second address associated with a second index (bd2) in the BDS Legendre sequence may be requested, for example, to determine a B1C PRN code.

As further depicted in FIG. 5, the example PRN code generator module 500 includes a rearrange module 550. A rearrange module 550 may be any hardware, firmware, software, or combination thereof, configured to receive one or more address requests from the plurality of tracking channels 530a-530n and route the data request specified by the one or more address requests to the one or more electrically connected ROM managers 552a-552n. In addition, the rearrange module 550 may be further configured to route the return of the received data from a read-only memory 534a-534n to the requesting tracking channel 530a. Once a read request is serviced by the associated ROM manager 552, the rearrange module 550 may route the read data to the requesting tracking channel 530a-530n.

As further depicted in FIG. 5, the example PRN code generator module 500 includes a plurality of ROM managers 552a-552n, each ROM manager 552a-552n associated with a read-only memory 534a-534n. A ROM manager 552a-552n may be configured to service requests issued by the one or more tracking channels 530a-530n and routed by the rearrange module 550 by reading the associated read-only memory 534a-534n at the appropriate address and returning the associated data. As described in relation to FIG. 4, the data associated with a given address may be correlated with the code sequence value (e.g., Legendre code value) at the given index. In some embodiments, the ROM manager 552a-552n may further indicate the availability and/or next availability of the associated read-only memory 534a-534n to the rearrange module 550.

As further described herein, the PRN code generator module 500 may be required to meet specified timing constraints, in order to support a plurality of tracking channels. For example, each tracking channel 530a-530n may generate a chip of the PRN code at a code rate of $F_o$ to match the band frequency ($F_o$) of the associated transmission band (e.g., L1 band). In a GPS system, the L1C signal is transmitted on the L1 band at a frequency of 1.023 MHz. Similarly, in a BDS system, the B1C signal is transmitted on the B1 band, also at a rate of 1.023 MHz. Thus, every tracking channel 530a-530n may generate a bit of the associated PRN code at a rate of 1/1.023 MHz, or about every 1 microsecond. In order to generate a bit of the associated PRN code at a rate of 1

$$\frac{1}{F_o}$$

seconds, each tracking channel 530a-530n may access a read-only memory 534a-534n and receive the required values of the code sequence (e.g., Legendre code sequence) at a rate of $$\frac{1}{F_o}$$

seconds.

Utilizing the known required access rates based on the particular satellite-based navigation system, and the supported satellite-based navigation systems by a particular set of tracking channels 530a-530n, the architecture of the PRN code generator module 500 may be determined and parameterized at the build time of the PRN code generator module 500.

As an example, suppose one clock cycle is required to access the data at a particular address in a read-only memory (e.g., read-only memory 534a-534n). The number of data accesses ($N_{DA}$) that may be performed in a navigation system cycle $$\left(\frac{1}{F_o}\right)$$

is dependent on the clock speed ($F_{CLK}$) of the PRN code generator module (e.g., PRN code generator module 500), such that $$N_{DA} = \frac{F_{CLK}}{F_o}.$$

Further, each tracking channel (e.g., tracking channel 530a-530n) may be required to access a read-only memory twice every navigation system cycle, since the PRN code requires two Legendre sequence values for each PRN code value. Thus, the number of read-only memories ($N_{ROM}$) required to support a given number of tracker channels ($N_{TRK}$), and given a clock speed ($F_{CLK}$) of the PRN code generator module may be determined by the equation:

$$N_{ROM} = \text{CEILING}\left(\frac{2*N_{TRK}}{\frac{F_{CLK}}{F_o}}\right)$$

For example, on a PRN code generator module running at a clock speed 64 times the speed of the band frequency ($F_o$), the number of read-only memories required to support 64 tracking channels may be determined by:

$$N_{ROM} = \text{CEILING}\left(\frac{2*64}{\frac{64*F_o}{F_o}}\right) = \text{CEILING}\left(\frac{128}{64}\right) = 2 \ ROMs$$

Thus, in an instance in which the PRN code generator clock frequency is fixed, and a desired number of tracking channels is determined, the number of ROMs may be determined, such that the generation of the PRN code generator may be parametrized and the number of ROMs configured at build time.

Similarly, in an instance in which the number of ROMs are fixed, for example, in an instance in which the silicon area is limited, and the number of desired tracking channels is determined, the required clock frequency may be determined by the equation:

$$F_{CLK} = \frac{2*N_{TRK}*(F_o)}{N_{ROM}}$$

The parameterized PRN code generator modules described herein represent significant silicon area savings. For example, previous solutions required a ROM to store each of the Legendre sequence values for each tracking channel. Thus, to support 64 tracking channels, two ROMs were necessary for each tracking channel and 128 ROMs were required by the PRN code generator module. By sharing the read-only memories across tracking channels, from the calculations above, only 2 read-only memories are required to support 64 tracking channels when the clock frequency of the PRN code generator module is at least 64 times the code rate ($F_o$).

Figure 6:
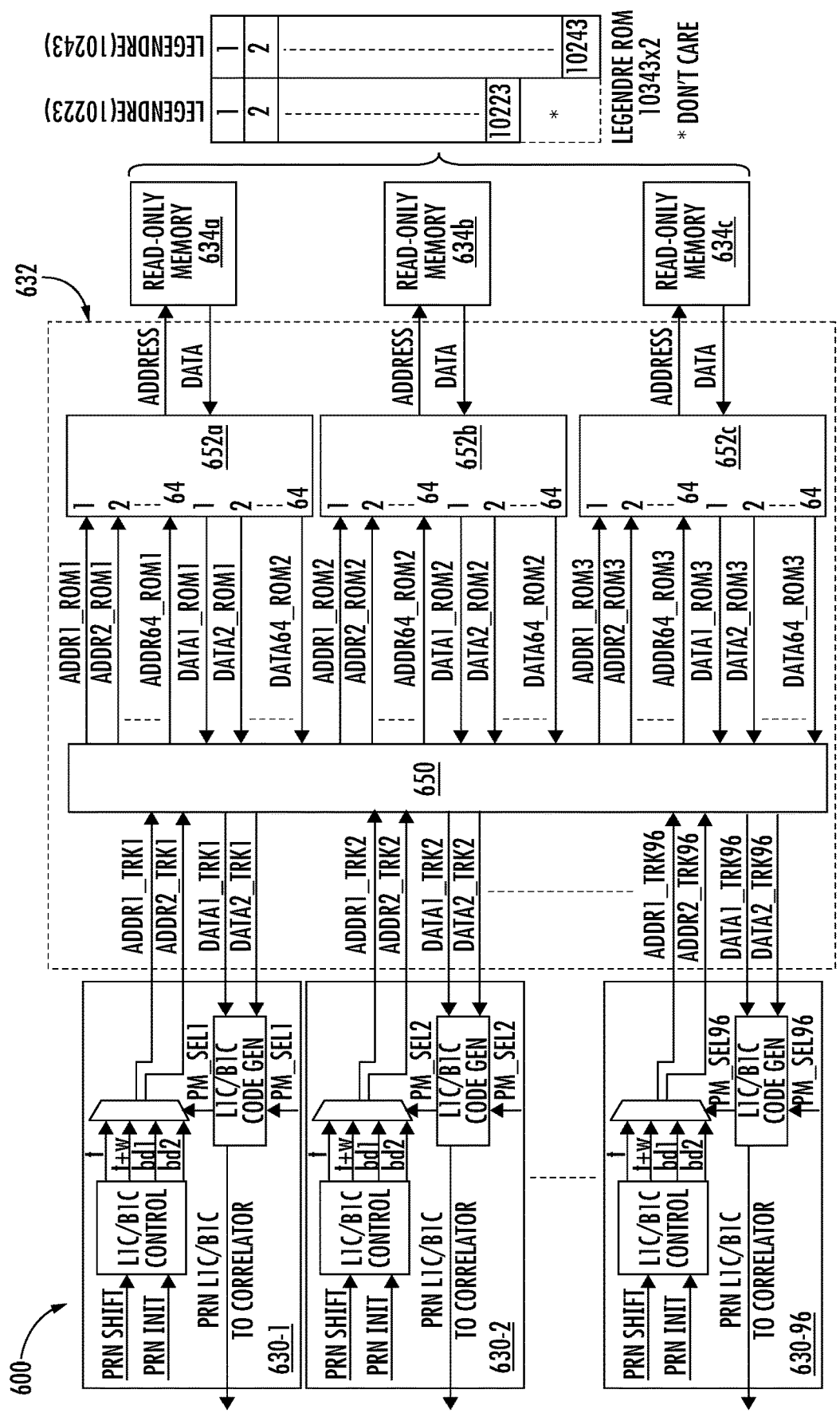
FIG. 6 illustrates an example parameterized PRN code generator module supporting ninety-six tracking channels in accordance with one or more embodiments of the present disclosure.

Referring now to FIG. 6, an example parameterized PRN code generator module 600 supporting 96 tracking channels 630-1-96 is provided. As depicted in FIG. 6, the example parameterized PRN code generator module 600 is configured to operate at a clock frequency 64 times the frequency of the band frequency ($F_{CLK}$=64*$F_o$). The example parameterized PRN code generator module 600 of FIG. 6 includes 96 tracking channels 630-1-96 configured to support generation of a PRN code (e.g., PRN code 224) for both an L1C signal and a B1C signal depending on the currently selected satellite-based navigation system. Each tracking channel 630-1-96 is electrically connected to a rearrange module 650 and configured to transmit two addresses requests corresponding with the two code sequence (e.g., Legendre sequence) indexes required to generate the chip of the PRN code, and receive the corresponding code value associated with the requested indexes. The rearrange module 650 is configured to receive requests from the 96 tracking channels 630-1-96, and distribute the requests among three electrically connected ROM managers 652a-652c. The ROM managers 652a-652c are each further electrically connected to a read-only memory 634a-634c configured to store the code sequences required to generate the PRN codes. As further depicted in FIG. 6, the rearrange module 650 and ROM managers 652a-652c may comprise memory interface circuitry 632.

As depicted in FIG. 6, the example parameterized PRN code generator module 600 includes 96 tracking channels 630-1-96 and three read-only memories 634a-634c. As described herein, the parameterized PRN code generator module 600 may be guaranteed to meet timing based on an operating clock frequency running at 64 times the frequency of the band frequency ($F_{CLK}=64*F_o$). For example, the number of ROMs necessary to guarantee timing for 96 tracking channels, when the operating clock ($F_{CLK}$) is operating at 64 times the band frequency ($F_o$) may be determined by the equation:

$$N_{ROM} = \text{CEILING}\left(\frac{2*N_{TRK}}{\frac{F_{CLK}}{F_o}}\right) = \left(\frac{2*96}{64}\right) = \left(\frac{192}{64}\right) = 3 \; ROMs$$

While the parameterized PRN code generator module 600 parameterized according to the description provided herein only requires 3 ROMs, other examples may require up to 192 ROMs. Thus, the silicon area savings realized by the parameterized PRN code generator module 600 may be significant.

Figure 7:
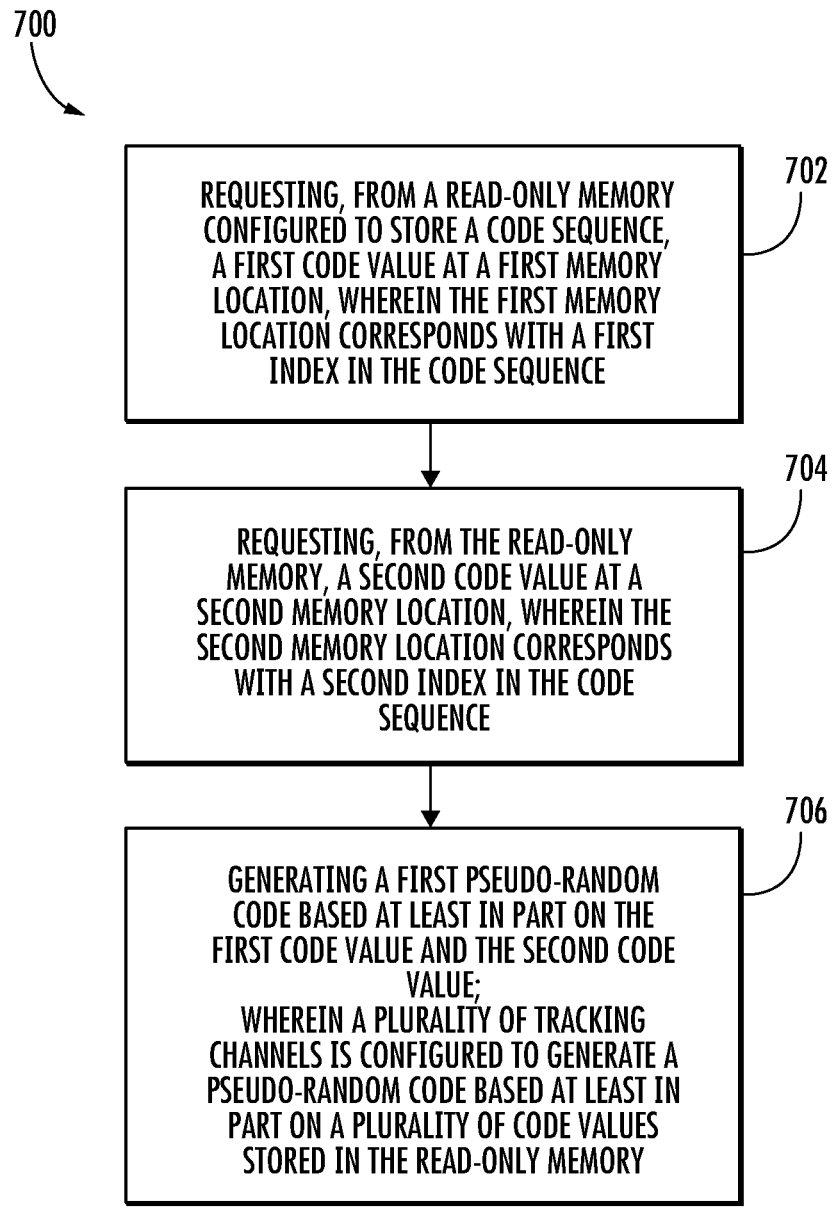
FIG. 7 illustrates a process for generating a PRN code on a satellite-based navigation system receiver in accordance with one or more embodiments of the present disclosure.

Referring now to FIG. 7, a process 700 for determining a PRN code on a satellite-based navigation system receiver is provided. At block 702, the satellite-based navigation system receiver (e.g., satellite-based navigation system receiver 102), may request, from a read-only memory (e.g., read-only memory 334, 534a-534n, 634a-634c) configured to store a code sequence (e.g., Legendre sequence), a first code value at a first memory location, wherein the first memory location corresponds with a first index in the code sequence. As described herein, the satellite-based navigation system receiver may include one or more read-only memories configured to each store one or more code sequences. For example, as described in relation to FIG. 4, the example read-only memory 334 contains an L1C Legendre sequence 440 to support generation of a PRN code to be correlated with an L1C GPS signal, and a B1C Legendre sequence 442 to support generation of a PRN code to be correlated with a B1C BDS signal. As described herein, the read-only memory may be direct accessible memory, such as a LUT, wherein the code value may be retrieved by a tracking channel by supplying an address associated with the required index in the code sequence.

At block 704, the satellite-based navigation system receiver may request, from the read-only memory, a second code value at a second memory location, wherein the second memory location corresponds with a second index in the code sequence. To generate a PRN code for both the L1C GPS signal and the B1C BDS signal, two code sequence (e.g., Legendre sequence) values are required. For example, the L1C Weil code requires a first Legendre sequence value at a first index (t) and a second Legendre sequence value at a second index (t+w). Similarly, the B1C Weil code requires a first Legendre sequence value at a first index (bd1) and a second Legendre sequence value at a second index (bd2). In some embodiments, such as depicted in FIG. 5-FIG. 6, both code sequence values may be requested simultaneously via two address line requests to the memory interface circuitry (e.g., memory interface circuitry 332, 532, 632).

At block 706, the satellite-based navigation system receiver may generate a first pseudo-random code (e.g., PRN code 224) based at least in part on the first code value and the second code value; wherein a plurality of tracking channels is configured to generate a pseudo-random code based at least in part on a plurality of code values stored in the read-only memory. As described herein, a satellite-based navigation system receiver may be configured such that a plurality of tracking channels are configured to share a single read-only memory. In some embodiments, (as described in relation to FIG. 5-FIG. 6) a plurality of tracking channels may be configured to share a plurality of read-only memories, wherein the plurality of read-only memories is smaller than the plurality of tracking channels. In some embodiments, one or more PRN codes may be based on the two code values received from the read-only memory. In some embodiments, one or more of the plurality of tracking channels may be configured to generate PRN codes for a plurality of satellite-based navigation systems (e.g., GPS and BDS). In such an instance, the read-only memories may comprise a plurality of code sequences, each code sequence associated with a different satellite-based navigation system. In some embodiments, a tracking channel may be configured to switch between the satellite-based navigation systems and may request the associated code value based on the selected satellite-based navigation system.

Figure 8:
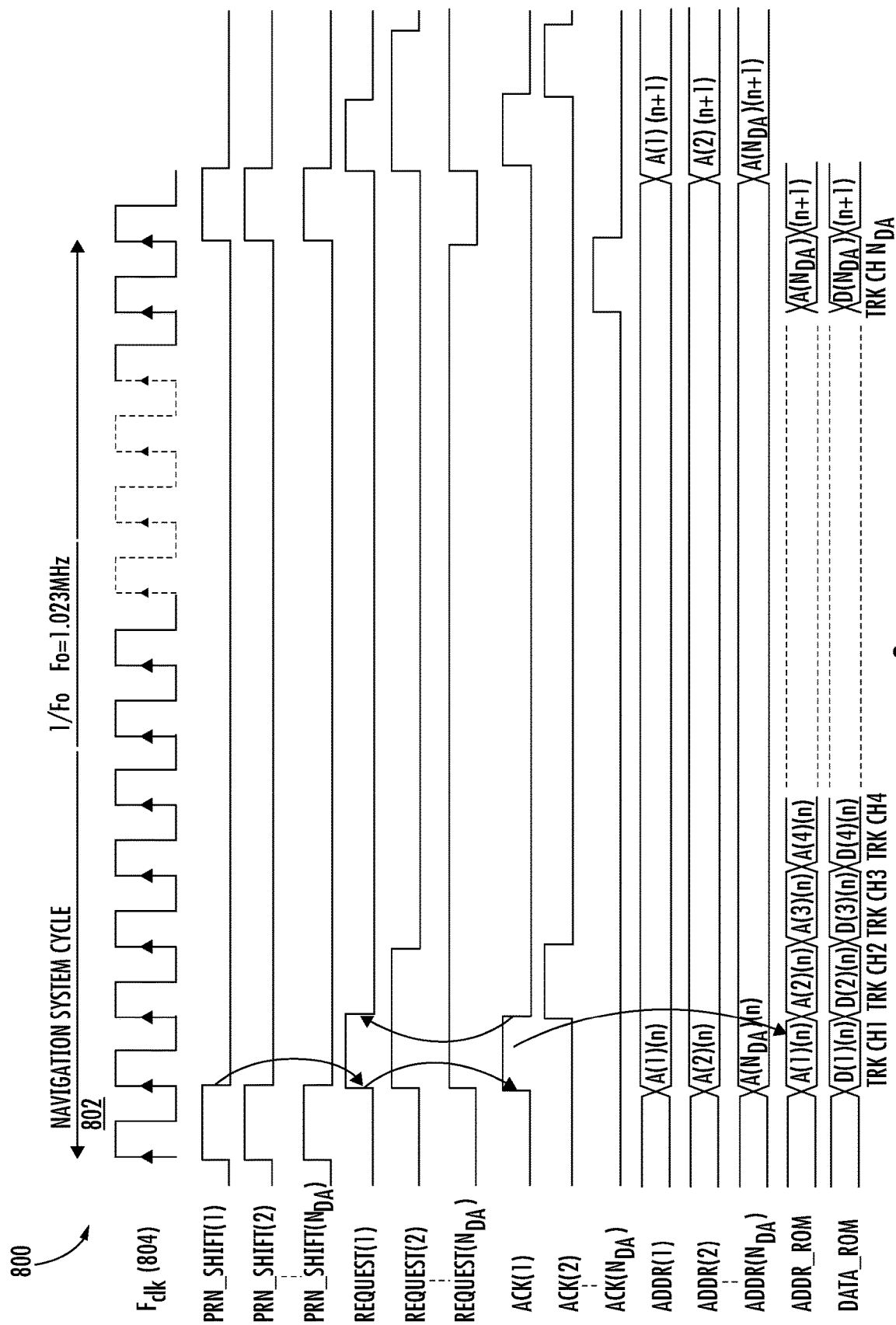
FIG. 8 illustrates an example timing diagram on an example PRN code generator module in accordance with one or more embodiments of the present disclosure.

Referring now to FIG. 8, a timing diagram 800 depicting the response of a read-only memory (e.g., read-only memory 334, 534a-534n, 634a-634c) to a request for a plurality of code values at specified indices within a navigation system cycle 802

$$\left(\frac{1}{F_o}\right)$$

of the band frequency ($F_o$) is provided.

A navigation system cycle 802 may relate to the duration of one clock cycle according to the frequency of the navigation system band ($F_o$). For example, if the satellite-based navigation system receiver is configured to receive an L1C signal on the L1 band of GPS, the navigation band frequency may be at or near 1.023 MHz, and the navigation system cycle may be $$\left(\frac{1}{F_o}\right)$$

or about 1 microsecond.

As described herein, the number of data accesses ($N_{DA}$) that may be performed in a navigation system cycle 802 is dependent on the clock speed ($F_{CLK}$ 804) of the PRN code generator module (e.g., PRN code generator module 500, 600), such that $$N_{DA} = \frac{F_{CLK}}{F_o}.$$

For example, if the frequency of the operating clock ($F_{CLK}$ 804) on the PRN code generator module is 64 times the band frequency (F), then $N_{DA}$ is 64 and 64 data access may be made from a ROM during one navigation system cycle 802 of the band frequency. As depicted in FIG. 8, $N_{DA}$ requests are made based on $N_{DA}$ shifts of the PRN code during a single navigation system cycle 802. Each request of the $N_{DA}$ requests asserts an address associated with the code sequence value the tracking channel (e.g., tracking channel 330a-330n, 530a-530n, 630-1-96) requires to generate the chip of a PRN code. As depicted by the signals ADDR_ROM and DATA_ROM of the timing diagram 800, the read-only memory services an address per clock cycle, providing the data associated with the requested index. As depicted in FIG. 8, $N_{DA}$ tracking channel requests may be serviced during the navigation system cycle 802.

Figure 9:
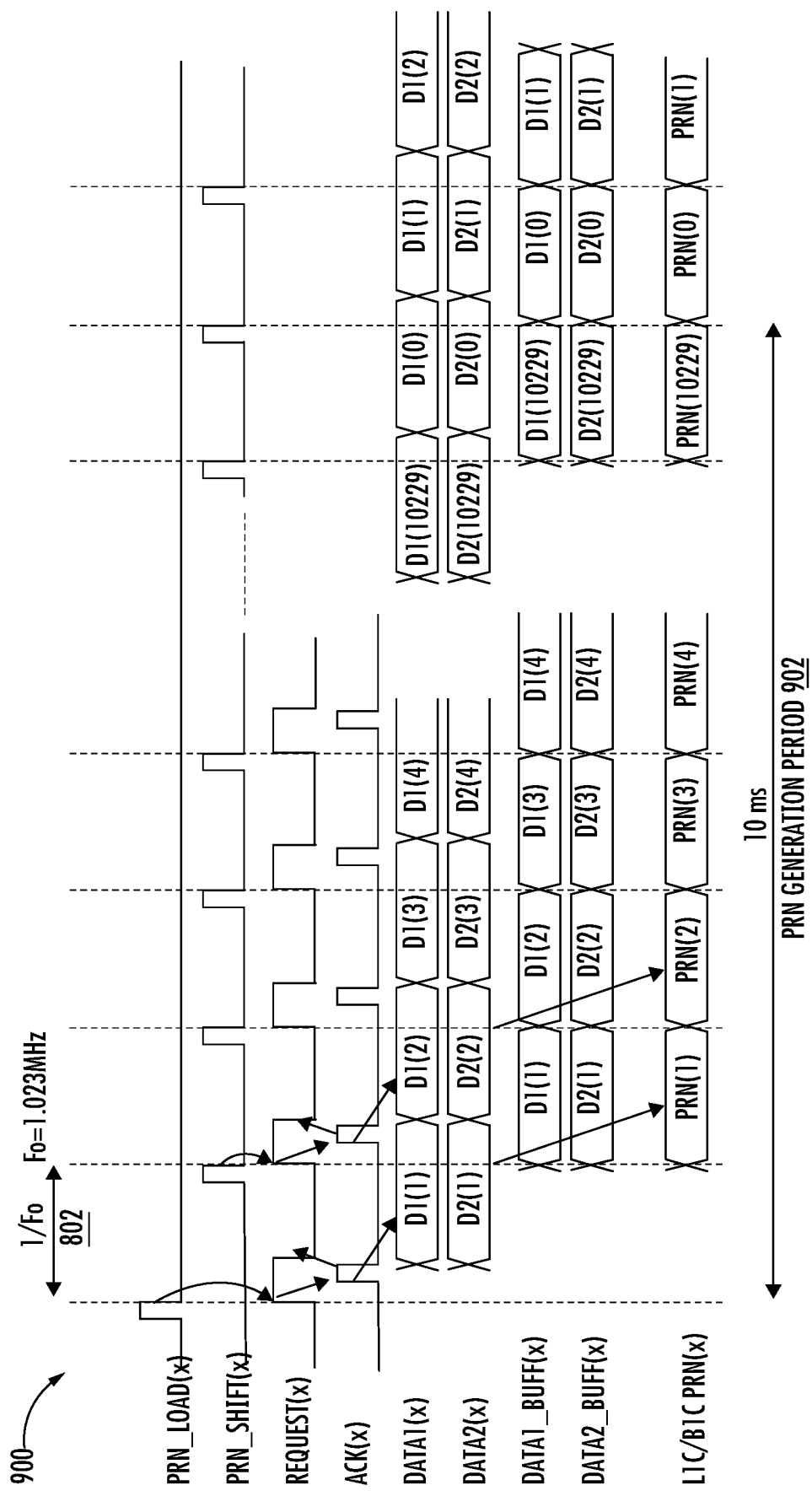
FIG. 9 illustrates an example timing diagram on an example PRN code generator module in accordance with one or more embodiments of the present disclosure.

Referring now to FIG. 9, a timing diagram 900 depicting the generation of an L1C code based on data received from a read-only memory (e.g., read-only memory 334, 534a-534n, 634a-634c) is provided. As shown in FIG. 9, a set of requested data values (DATA1(x), DATA2(x)) may be received by a tracking channel (e.g., tracking channel 330a-330n, 530a-530n, 630-1-96) during the first navigation system cycle 802. The tracking channel may buffer the data values and utilize the buffered data values to compute a chip of the PRN code (e.g., PRN code 224) during the second navigation system cycle 802. As shown in FIG. 9, a new chip of the PRN code is generated each navigation system cycle 802 based on the updated address request and received data. The full PRN code may be generated within the PRN generation period 902.

Figure 10:
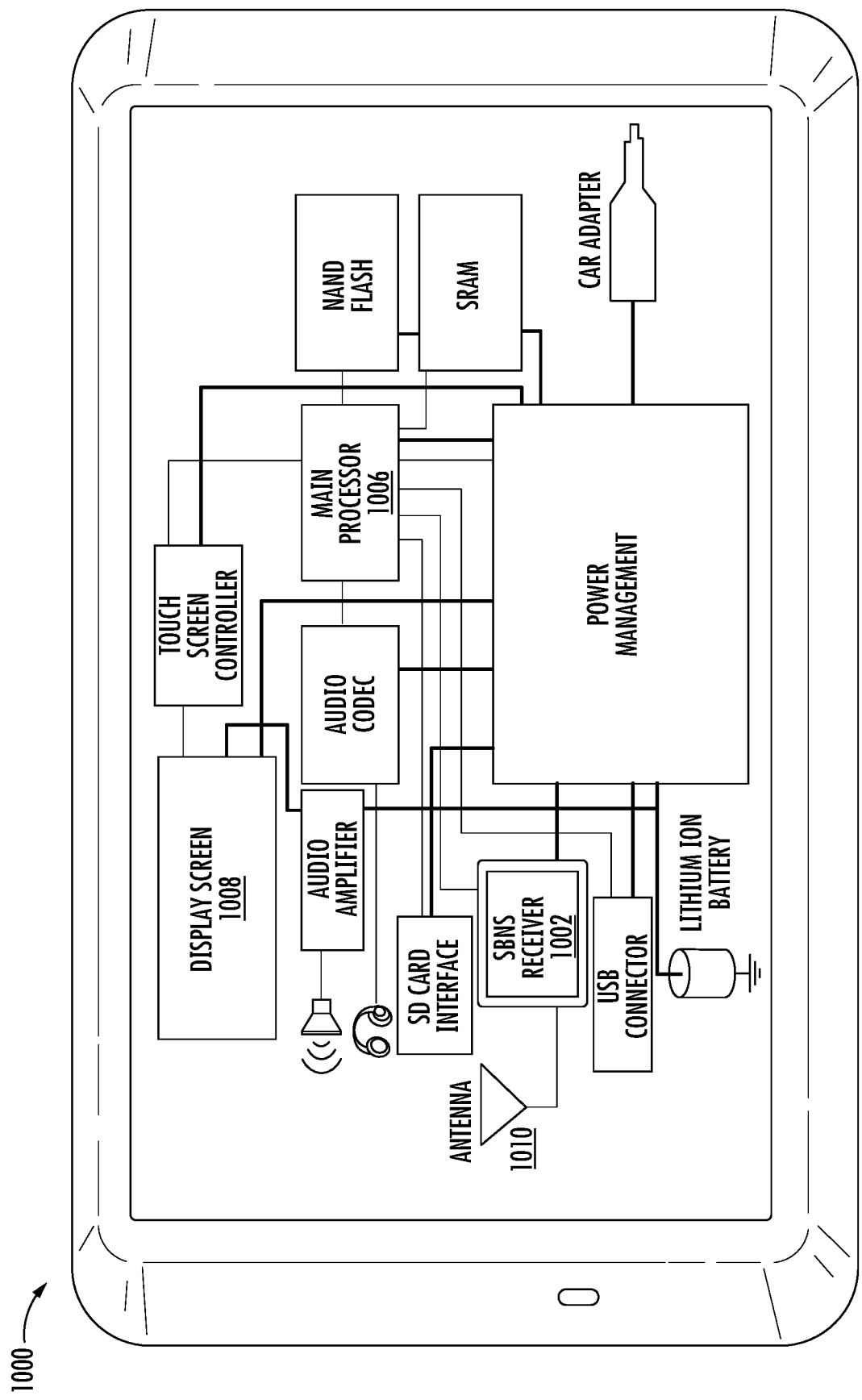
FIG. 10 illustrates an example portable navigation device comprising a satellite-based navigation system receiver in accordance with one or more embodiments of the present disclosure.

Referring now to FIG. 10, an example portable navigation device 1000 is provided. As depicted in FIG. 10, the example portable navigation device 1000 includes a satellite-based navigation system receiver 1002 electrically connected to an antenna 1010. The satellite-based navigation system receiver 1002 may determine a location based on the received signals at the antenna 1010 and transmit the location to a main processor 1006. The main processor 1006 may receive the location and prepare the location for display on a display screen 1008.

Other components of the example portable navigation device 1000 as depicted in FIG. 10, may include a power management module; a USB connector, lithium ion battery, and/or car adapter; memory components such as SRAM and NAND Flash; audio components such as an audio codec and audio amplifier; and display control components, such as a touch screen controller.

As depicted in FIG. 10, the example portable navigation device 1000 includes an antenna 1010. An antenna 1010 may be any device designed to receive radio signals transmitted in accordance with a satellite-based navigation system, for example GPS, BDS, GLONASS, Galileo, etc. The antenna 1010 may be further configured to convert the received radio signals into an electronic signal to be utilized by a satellite-based navigation system receiver 1002. As described herein, the antenna 1010 may be configured to receive electronic signals on a number of different frequency bands (e.g., L1 band, L2 band, L5 band) and across a number of different satellite-based navigation system types (e.g., GPS, BDS, etc.). Radio signals received and converted into electronic signals may be transmitted to the satellite-based navigation system receiver 1002 and correlated with one or more ranging codes/PRN codes, as described herein.

While this detailed description has set forth some embodiments of the present invention, the appended claims cover other embodiments of the present invention which differ from the described embodiments according to various modifications and improvements. For example, one skilled in the art may recognize that such principles may be applied to any electronic device that utilizes multiple code sequences (e.g., Legendre sequences) to generate a PRN code for correlation with a satellite-based navigation system signal. For example, a portable navigation device, a mobile phone, a smart phone, a tracking device, a watch, a car, or any other device requiring real-time location acquisition through a satellite-based navigation system.

Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A satellite-based navigation system receiver comprising:
   a plurality of tracking channels,
      wherein each tracking channel of the plurality of tracking channels is configured to generate a first pseudo-random code in accordance with a first satellite-based navigation system and a second pseudo-random code in accordance with a second satellite-based navigation system; and wherein the first pseudo-random code is based at least in part on a first code sequence and the second pseudo-random code is based at least in part on a second code sequence;
   a read-only memory configured to store the first code sequence and the second code sequence,
      wherein the plurality of tracking channels are configured to receive first values from the first code sequence in the read-only memory to generate the first pseudo-random code, and second values from the second code sequence in the read-only memory to generate the second pseudo-random code.

2. The satellite-based navigation system receiver of claim 1, wherein each tracking channel of the plurality of tracking channels is configured to generate the first pseudo-random code in accordance with a global positioning system (GPS) satellite-based navigation system and the second pseudo-random code in accordance with a BeiDou satellite-based navigation system.

3. The satellite-based navigation system receiver of claim 1, wherein the first pseudo-random code and the second pseudo-random code are transmitted as a portion of a first ranging code and a second ranging code, respectively.

4. The satellite-based navigation system receiver of claim 2, wherein the first pseudo-random code transmitted in accordance with the GPS satellite-based navigation system is transmitted as a portion of an L1C signal and the second pseudo-random code transmitted in accordance with the BeiDou satellite-based navigation system is transmitted as a portion of a B1C signal.

5. The satellite-based navigation system receiver of claim 4, wherein the first code sequence and the second code sequence are Legendre sequences.

6. The satellite-based navigation system receiver of claim 1, further comprising:
   a plurality of read-only memories, wherein each read-only memory of the plurality of read-only memories is configured to store the first code sequence and the second code sequence; and
   a clock having a clock frequency, wherein the clock is configured to synchronize one or more operations on the satellite-based navigation system receiver.

7. The satellite-based navigation system receiver of claim 6,
   wherein a number of read-only memories in the plurality of read-only memories is determined based at least in part on the clock frequency of the clock.

8. The satellite-based navigation system receiver of claim 6, wherein the clock frequency is determined based at least in part on a number of read-only memories in the plurality of read-only memories.

9. A method for determining a pseudo-random noise (PRN) code on a satellite-based navigation system, the method comprising:
   receiving at a plurality of tracking channels, from a read-only memory configured to store a first code sequence and a second code sequence, first values from the first code sequence in the read-only memory;
   generating at each of the plurality of tracking channels a first pseudo-random code in accordance with a first satellite-based navigation system, wherein the first pseudo-random code is based at least in part on the first code value and the second code valuesequence;
   generating at each of the plurality of tracking channels a second pseudo-random code in accordance with a second satellite-based navigation system, wherein the second pseudo-random code is based at least in part on the second code sequence.

10. The method of claim 9, wherein each tracking channel of the plurality of tracking channels is configured to generate the first pseudo-random code in accordance with a global positioning system (GPS) satellite-based navigation system and the second pseudo-random code in accordance with a BeiDou satellite-based navigation system.

11. The method of claim 9, wherein the first pseudo-random code and the second pseudo-random code are transmitted as a portion of a first ranging code and a second ranging code, respectively.

12. The method of claim 10, wherein the first pseudo-random code transmitted in accordance with the GPS satellite-based navigation system is transmitted as a portion of an L1C signal and the second pseudo-random code transmitted in accordance with the BeiDou satellite-based navigation system is transmitted as a portion of a B1C signal.

13. The method of claim 12, wherein the first code sequence and the second code sequence are Legendre sequences.

14. A portable navigation device, comprising:
   an antenna configured to receive an acquisition signal from a remote satellite; and
   a satellite-based navigation system receiver electrically connected to the antenna, the satellite-based navigation system receiver comprising:
      a plurality of tracking channels,
      wherein each tracking channel of the plurality of tracking channels is configured to generate a first pseudo-random code in accordance with a first satellite-based navigation system and a second pseudo-random code in accordance with a second satellite-based navigation system; and wherein the first pseudo-random code is based at least in part on a first code sequence and the second pseudo-random code is based at least in part on a second code sequence;
   a read-only memory configured to store the first code sequence and the second code sequence,
      wherein the plurality of tracking channels are configured to receive first values from the first code sequence in the read-only memory to generate the first pseudo-random code, and second values from the second code sequence in the read-only memory to generate the second pseudo-random code.

* * * * *